United States Patent [19]

Johnsen et al.

[11] Patent Number: 4,791,281
[45] Date of Patent: Dec. 13, 1988

[54] ENCODING AND DECODING SYSTEM

[75] Inventors: Edward L. Johnsen, Wayland; David C. Hughes, South Yarmouth, both of Mass.

[73] Assignee: C.P.C. Investment Trust, Nashua, N.H.

[21] Appl. No.: 919,805

[22] Filed: Oct. 16, 1986

[51] Int. Cl.$^4$ ............................................. G06K 15/00
[52] U.S. Cl. .................................. 235/383; 235/462; 283/56; 364/401
[58] Field of Search ............... 235/385, 462, 467, 383, 235/432, 382; 283/51, 52, 56; 364/401

[56] References Cited

U.S. PATENT DOCUMENTS

| | | | |
|---|---|---|---|
| 3,632,995 | 1/1972 | Wilson | 283/56 X |
| 3,754,119 | 8/1973 | Scott et al. | 235/383 |
| 3,899,381 | 8/1975 | O'Brien et al. | 283/56 X |
| 3,959,624 | 5/1976 | Kaslow | |
| 4,554,446 | 11/1985 | Murphy et al. | 235/385 X |
| 4,672,377 | 6/1987 | Murphey et al. | |

Primary Examiner—David L. Trafton
Attorney, Agent, or Firm—Robert M. Asher

[57] ABSTRACT

A system for processing coupons, documents, or the like including the assembling multiple encoding and decoding of coupons, or other documents requiring coding for the purpose of making the coupon uniquely identifiable and traceable. A machine encodes individual coupons or booklets or other documents with a unique code, a subsequent machine reads the encoded coupon or booklet of coupons and applies additional information such as a person's name and address, and another unique code to the coupon, coupon booklet or the like, and records all of this data in a computer master data base. The coupons, coupon booklets, or the like, are then issued to the person whose name appears on the document. After presentation of the coupon it is then decoded and compared to the master data base to validate it or cancel it, and can be stored for demographic or geographic analysis in the master data base. The system may be combined with a retail store's automated system which reads the product information and calculates price after each coupon has been decoded. The computer compares the coupon to all purchases being made, and if there is a match of a presented coupon and an item purchased, the decoding machine validates the coupon and the store system then deducts the coupon credit from the presenter's invoice.

16 Claims, 3 Drawing Sheets

ENCODING AND DECODING SYSTEM

FIELD OF THE INVENTION

The present invention relates to coupons, such as are used in retail trade for the granting of credits, and to the acquisition of information from such coupons. The invention may be applied to other types of documents such as the issuance of food stamps and other like documents where security uniqueness, and traceability of a document are required.

BACKGROUND OF THE INVENTION

In the merchandising arts the importance of demographic and geographic information acquired from trade coupons is well understood. There is also a problem of security and protection against improper use of trade coupons. For example, instances are known in which large numbers of coupons are fraudulently delivered to the issuer for reimbursement of the face value of the coupons without the sale of the corresponding merchandise having been made.

U.S. Pat. No. 3,108,824 to Fischer, et al, Oct. 29, 1963 for Periodical Containing Coupons and Method of Processing Thereof describes coupons coded for price and for other information. After the coupons have been redeemed a code reading machine reads the codes from the redeemed, coupons and derives demographic or geographic information, or both.

U.S. Pat. No. 4,097,067 to Schechter, June 27, 1978 for Printed Coupon Folder (a continuation-in-part of U.S. Pat. No. 4,010,964) describes a direct mail promotional package of coupons which may be imprinted with the universal product code for reading by scanner to assure that the purchaser is entitled to the credit provided by the coupon, and that the coupon credit is indeed for a product purchased.

U.S. Pat. No. 3,211,470 to Wilson, Oct. 12, 1965, describes a coded coupon carrying various information about the product, expiration date of the coupon, and other information. The coupon is coded along two areas and employs a self-checking type of coding. The coupon coding provides parity checking and regeneration codes, as well as data about manufacturer, product, and counterfeit checking code.

U.S. Pat. No. 3,734,534 to Fishkin, et al, May 22, 1973, for "Dual Document", describes a coupon having a middle section and two separable end sections. U.S. Pat. No. 4,139,149 to Crepeau, et al, Feb. 13, 1979, for Display System describes a code reader for reading product codes, a computer for processing the coded data, and display units for serially displaying data withdrawn from computer storage.

U.S. Pat. No. 4,365,148 to Whitney, Dec. 21, 1982, describes a system for attaching a label with the universal product code to a produc after weighing, entry of data, and withdrawal of information from a computer which analyzes the data and transmits the data to a label printer for printing price information, so that the customer can read the price imprinted on the label.

U.S. Pat. No. 4,028,537 to Snow, June 7, 1977 for Product Processing System with Price Printer describes a printer controlled in response to product identifying codes, such as the universal product (bar) code, to print on the product label the price information drawn from a computer memory and computed in the computer.

SUMMARY OF THE INVENTION

The present invention relates to a system or method of encoding and decoding of documents thereby identifying codes containing information within the document or any portion thereof which can be used for the purpose of validation, tracking, and correlating.

The invention, an encoding and decoding system comprises an encoding machine for uniquely encoding portions of the coupon or documents with related or unrelated codes, the method of assembling the encoded portions of the document, applying additional unique encoding to the document, decoding the previous encoding which is then stored in a master data base, future decoding of any portionof the multiple encodings, and relating this decoding to any or all encoding and information contained in the assembled document.

Encoded documents, such as discount coupons or discount coupon booklets, may be distributed to a specified person. The person may present for a discount any or all of these encoded coupons at which time the presented coupons are read by a decoding machine which will compare the encoded information on the coupon with the codes stored in the computer system to validate it. If the presented coupon is valid, the computer will flag the corresponding code and record additional information related to the transaction, such as time, date, and place of use in its computer memory system. The computer system will not allow previously flagged codes to be used again for validation. Further, the decoding machine will physically invalidate the valid coupon by retaining it and destroying the encoding. If the presented encoded coupon is invalid, the decoding machine will not accept the coupon, and will not authorize the discount.

The encoding and decoding system may be connected with a retail store's computerized checkout system to deduct the coupon discount from the value of the products purchased. A comparison by the decoding machine may be employed to assure that the discount is given only against a purchase of the product to which the validated coupon pertains.

DESCRIPTION OF THE DRAWINGS

The various objects, advantages, and novel features of the invention will be more fully understood from a reading of the following detailed description, in which like reference numerals refer to like parts, and in which.

DETAILED DESCRIPTION OF THE INVENTION

Figure 1:
FIG. 1 is an illustrative view of a coupon which may be used in practicing the invention.
Figure 2:
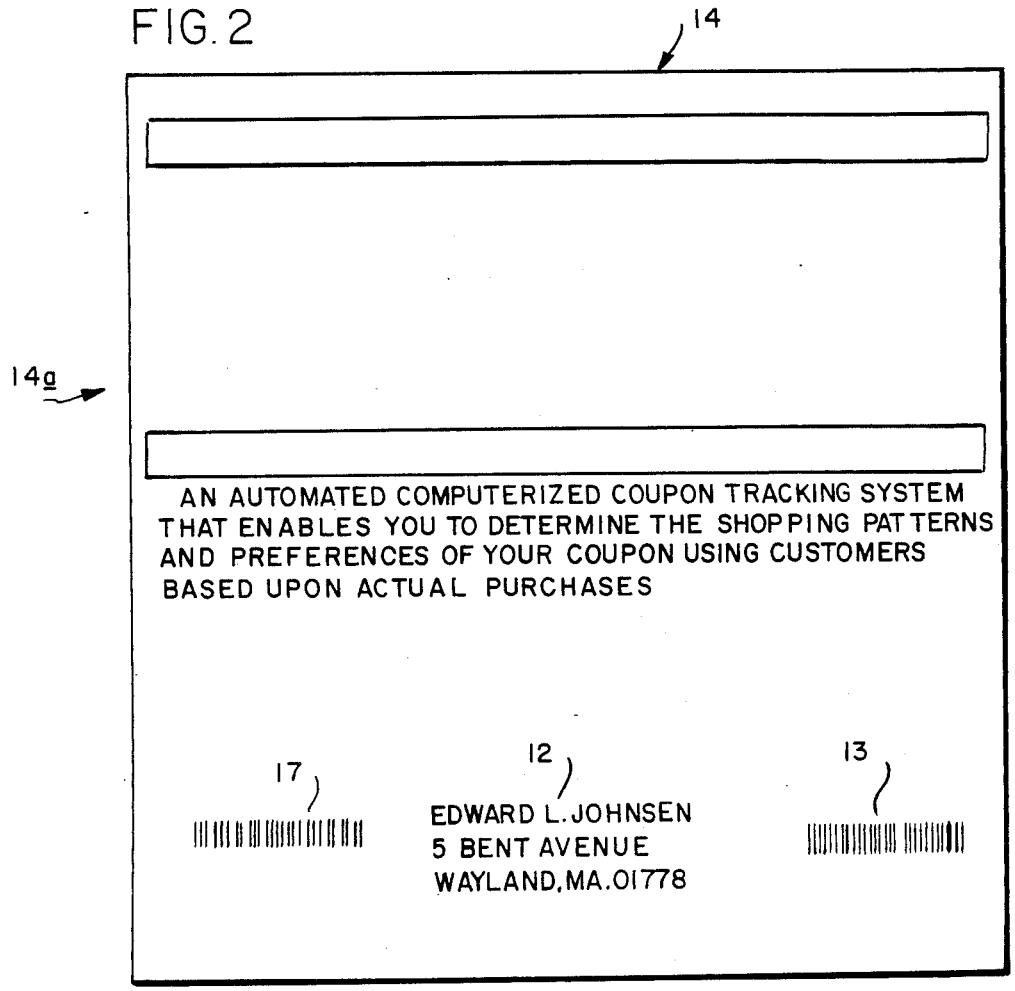
FIG. 2 is an illustrative view of the cover of a coupon document which may contain singular or multiple coupons therein as shown in FIG. 1.
Figure 3:
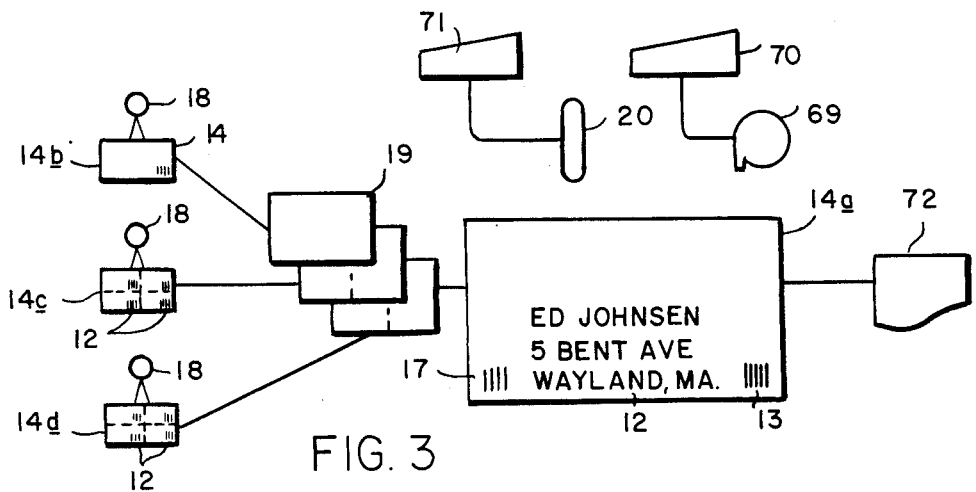
FIG. 3 is a schematic drawing of the sequence of assembly and multiple encoding of a coupon and coupon booklet.

Referring to FIG. 1, a coupon 10 carries an advertising message 11 of any desired kind as indicated, and may contain an expiration date 15, terms and conditions 16, and any further desired information. The coupon 10 will carry a plurality of unique codes 9 including unique code 13, a portion of which 13a may be another unique code relating to cover 14 as seen in FIGS. 1 and 2. Another unique code 13b of code 13 may relate to certain information about the coupon such as the product, manufacturer, issuer, and discount alue. The coupon 10 may be detached from a booklet 14a containing multiple coupons sent to a household. Each coupon 10 will be uniquely identifiable within the booklet 14a and cover 14, as seen in FIGS. 2 and 3 using various codes. The plurality of codes may be located anywhere on the coupon. The codes may be entered in magnetic ink, either machine or human readable, or may be encoded other than by a bar code as schematically indicated here. The code may have its own unique introductory and terminating code portions. The coupon 10 may also contain coding on both surfaces, or may be contained in the sub-straight being used.

FIG. 2 illustrates the cover 14 of the booklet of coupons 14a (See FIG. 3), the code 13-13b which identifies the coupons. The name and address 12 of the recipient and an additional code 17 are applied as illustrated in FIG. 3 to uniquely identify the recipient and, thus, traceable to the recipient by relating the codes.

FIG. 3 illustrates the steps of the method of encoding each coupon 10 and each page 14b, 14c, and 14d, and cover 14 comprising a means for encoding a coupon with a unique code such as by an encoding machine 18, which may be mechanical, laser or ink jet imaging controlled by a computer, or any such device commonly used to print or image documents. The various coupons and cover are then collected and assembled 19 into a booklet 14a.

The assembled booklet 14a is then processed through a machine 20 which applies unique code 17 and name and address code 12 to the document cover 14a. Machine 20 is under the control of computer 71. The booklet 14a is then passed under another device 69 which reads all the codes and records the information in the master data base 70 for subsequent use. Subsequently, the information from master data base 70 is combined with the information in computer 71 to update the master data base so that when coupons are returned they can be identified from this master data base using their unique code 13. The booklet 14a of discount coupons is then forwarded for distribution 72 to the addressee. The process is then repeated for the next coupon booklet.

It is also possible to accomplish the above illustrated process by eliminating master data base 70. The decoding machine 69 reads the document codes on the document cover 14 and updates the name and address record in computer 71 with codes thus, eliminating code 17. Machine 20 images the name and address code 12 under control of computer 71.

Figure 4:
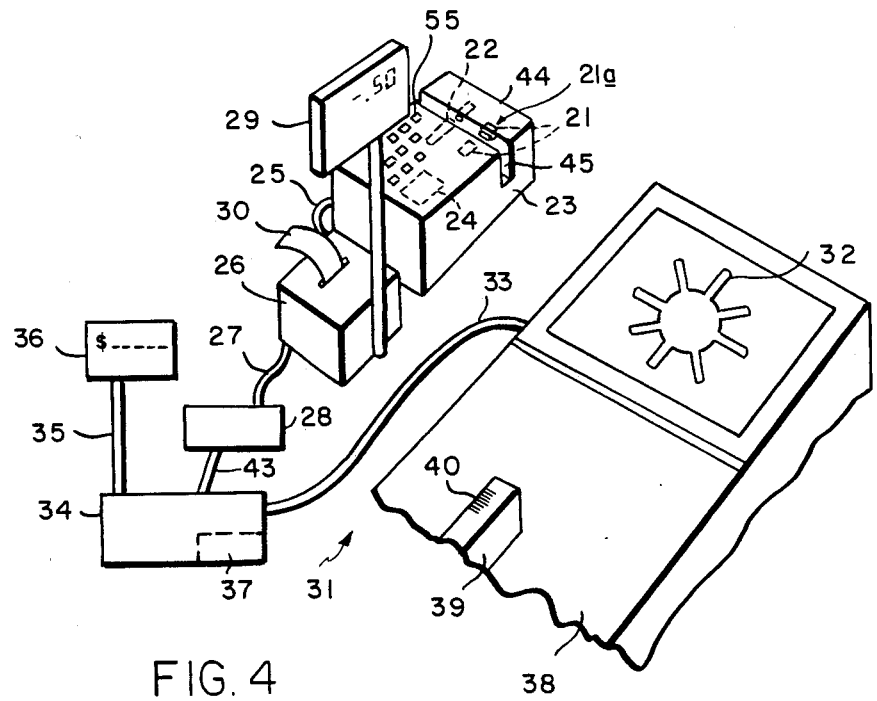
FIG. 4 is a schematic drawing of the decoding of a coupon during the redemption process at a retail store.

Referring to FIG. 4 in the redemption process, the coupon is read by decoding machine 44, comprising a reading head 21, or a plurality of reading heads 21a, and a punch or similar destruction device 22 in a housing 23. The housing 23 also contains electrical circuitry 24, which is connected to the reading head 21 and may activate the punch 22, or in lieu thereof, a printer. The reading head 21 may be the head of an optical reader, magnetic code reader, or a plurality of reading heads that have the ability to read the encoded information on coupon 10. The reading heads may also be able to read any other type of code.

A cable 25 connects the coupon decoding machine 44 to a printer 26. The printer 26 is connected by a cable 27 to a computer device 28. A display 29 may be connected to the printer 26. The printer 26 may print out a credit slip 30 to show the credit coded on the coupon 10, or any other coupons presented for redemption, and to the credit which would show on the display 29.

A store system 31 may comprise a laser scanner 32, of a type in use in grocery stores, and is connected by a cable 33 to a computer 34. The computer may actuate, by a suitable connection 35, a display 36. The computer has a memory device 37, in which is stored the price information corresponding to each product. When a conveyor 38 carries a product such as product 39, bearing a universal product code 40 to an operator, the operator passes the bar code 40 over the scanner 32 which scans the code and electronically via cable 33 presents the code to the computer 34. In response, computer 34 withdraws product and price information from memory device 37, displays the price on the computer display 36 for the customer. The computer also computes the total sale for print-out and display of the total on display 36. Such store systems, computers, and scanners are known.

A cable 43 connects store computer 34 to computer 28 which could have a data base of decoding machine 44 as a means of exchanging information, As computer 28 and data base 34 receives purchase information as read by scanner 32 from Universal Product Code 40 on package 39, computer 28 transmits the same data to computer 28 and data base 34 which stores it in a memory. Computer 28 contains the same information as data base 70.

The store computer operator now (or has heretofore accepted) accepts the discount coupons such as coupon 10 and inserts it in slot 45 of decoding machine 44. By inserting the coupon 10 through slot 45, housing 23, the head 21 may read the code 13. If magnetic coding is used, such as code EB13, CMC-7, or magnetic strips, or if the information is printed in magnetic ink to represent code 13, the information and credit may be read by a magnetic ink reader, such as are used to read the magnetic ink printing on checks. If a bar code is used, a bar code reader may be employed.

Immediately after reading head 21 has read code 13, the decoding machine transmits the decoded information to computer 28. If computer 28 determines that the coupon information from decoding machine 44 meets the validity criteria for coupon 10, such as expiration date 15 and terms and conditions 16, and there being a match of coupon information to purchase information, the coupon 10 is deemed valid. Otherwise, coupon 10 is deemed invalid by computer 28.

If computer 28 has deemed coupon 10 valid, the credit amount is transmitted to display 29 and to printer 30. At the same time, credit information regarding coupon 10 is transmitted to the store computer 34. Then computer 28 transmits a signal to decoding machine 44 which activates the physical invalidation of coupon 10. To accomplish physical invalidation of coupon 10, decoding machine 44 emits a signal which actuates the punch 22, which punches a hole in the coupon 10 through code 13. In lieu of a punch, a printer may be actuated to overlay the code 13 with an obliterating print to prevent future reading, such as in black ink on a bar code, or magnetic ink as required making a second reading impossible or ineffective. The coupon 10 is thus invalidated immediately upon being deemed valid.

If coupon 10 is deemed invalid by computer 28, a message is sent to display 29 and printer 26.

If there is no means to connect computer 28 to computer 34 via cable 43, there is no check by computer 28 to verify actual purchase. This function would then be accomplished by the store system 31. All other redemption validity requirements could still be maintained. The store operator would have to enter the credit information from credit slip 30 to computer 34.

In the event that a coupon has not been produced in accordance with the method as illustrated in FIG. 3, it is possible to enter into the computer 28 certain existing coding information from distributed coupons, such as the Universal Product Numbers printed in code EB13,, manually using the keyboard 55. The above mentioned steps would then be followed to assure that a valid redemption would take place. It may be possible to optically scan any coupon which has a Universal Product Code Number printed on it, and the machine will process the coupon as mentioned above, provided the identity of the product was established with the identity of the coupon.

Figure 5:
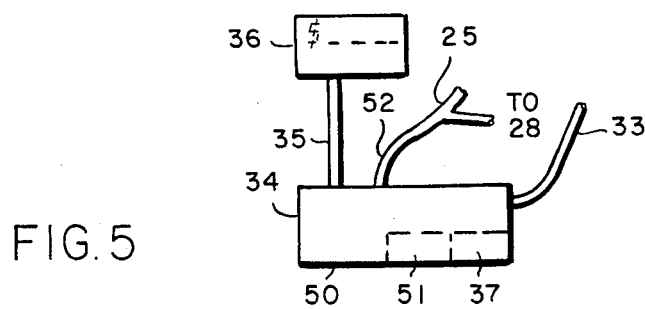
FIG. 5 is a schematic drawing of a modification of the embodiment of FIG. 4.

FIG. 5 illustrates a modification of the arrangement of FIG. 4. The cable 33 leads to a computer 50 which performs the function of computer 34. Computer 50 has a memory device 37 and a further memory section 51 of computer 50 receives the information from a branch 52, of cable 25, which in FIG. 4 is passed to memory device 28 and carries to the computer 50 both the coupon information and credit.

The computer 50 processes the credit as though entered as a credit in computer 34, as by a keyboard, or the like, and deducts the credit from the total, at the same time displaying the credit in the computrr display 36. The remaining information is entered in memory section 51 of the computer 50. From computer section 51 this information may then or later be "dumped" to tape or disc as desired. If the memory section 51 is in suitable form, such as tape or disc, it may be removed for processing the demographic or geographic information as desired. As the information read from the coupon 10 may include product information, the computer 50 may also compare the product information with the products purchased and scanned by the scanner 32 in the process of a sale to a customer, and if no identity is established between the product code read by the scanner, and that read by the coupon reading head 21, the computer may refuse credit, and may also refuse credit if the expiration date of the coupon has passed.

Figure 6:
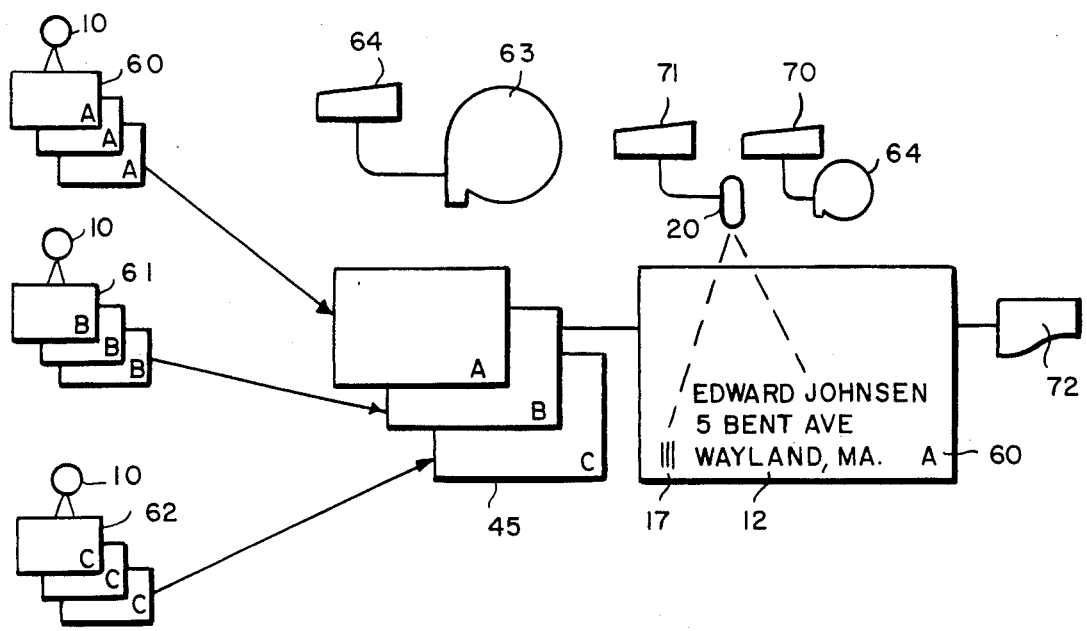
FIG. 6 is a schematic drawing of a modification of the embodiment of FIG. 3 for publication inserts.

FIG. 6 is a modification of FIG. 3 whereby multiple pages of discount coupons are produced 60, 61, and 62, each having different encoding. Group 60, 61, and 62 were prepared in the same manner as in FIG. 3, and the encoding is the equivalent. Group 60 has code "A", group 61 has code "B", and group 62 has code "C" as an example. As the groups 60, 61, and 62 are combined, a reader 63 transmits the coding to computer 64 for recording. The balance of the processing is then performed as illustrated in FIG. 3. The information in computer 64 is subsequently combined with the information in computer 71 to determine where the newly formed booklets were distributed.

This process of being able to uniquely encode coupons provides security and acts as a deterrent in the fraudulent production of coupons and in controlling the excess printing production which occurs from time to time that finds its way fraudulently into the redemption cycle. In addition, this process will enable issuers of coupons, such as cereal manufacturers and magazine pulishers, to determine geographic and demographic information about their customers and subscribers based upon the redemption of the coupons, because each coupon is traceable and unique. The missing link in the present use of coupons as an advertising vehicle is the ability to determine just where these coupons went and were redeemed. Furthermore, having the ability to identify the user based upon where the coupon was sent, and assuming that the coupon is used by the addressee, considerable savings can be had in future coupon advertising by not advertising to non-coupon users.

At first thought, one may believe that invalidation of the coupon immediately upon reading is an extra, unnecessary, useless step. Nevertheless, this step is an important feature of the invention. After the coupon 10 has been processed, the credit slip 30 may be used by the operator to balance the cash, or if desired, to use as a computer receipt. The imprint may be coded with the time, date, and location of the decoding machine 44. Thus, it may be forwarded to the manufacturer as evidence that a coupon has been received and credit given for the coupon. Thus, unusual or suspicious numbers of credit from that location may alert the manufacturer or coupon issuer to possible fraud. It is useless for a prospective fraudulent user to accumulate extra coupons for illegal or improper use. The coupon 10 may be used only once, and that once for a purchase of the proper product, within the expiration date, if any. In most instances there is not any need for a coupon 10 to be sent to the manufacturer or issuer, either through a retail store chain or directly, thus saving time, expense and decreasing any attempted fraud.

At a point of sale location which does not have installed a redemption processing system described in our invention, the redeemed coupons may be forwarded to a central clearing location for decoding and storage of the information contained on the coupon.

Thus, there has been disclosed in the foregoing specification a system which provides for the assembling multiple encoding, decoding and electronic and physical invalidation of a coupon, leading to improved protection against fraudulent coupon use over prior practice, and also making the handling of coupons easier and more efficient than heretofore.

What is claimed is:

1. A method for producing trackable documents comprising the steps of:
    applying a unique code to each document;
    reading said unique code from each document and recording data representative of said code in a data base;
    assembling one or more documents into a package means;
    applying a person code to said package means; and
    recording data representative of said person code in said data base in such a manner that it is associated with the data representative of said unique codes of the documents assembled in said package means, so that the unique code on a document can be used to identify uniquely the person code applied to the package means in which said document was assembled.

2. The method of claim 1 wherein said documents comprise coupons and said unique code comprises a first code representative of a first identifying characteristic of said coupon and a second code uniquely identifying said coupon.

3. The method of claim 2 wherein said first identifying characteristic of said coupon is the manufacturer of the product to which the coupon pertains.

4. The method of claim 1 wherein said package means comprises a booklet.

5. The method of claim 1 wherein said package means comprises a means for mailing.

6. The method of claim 5 wherein said person code comprises a mailing address.

7. The method of claim 6 wherein said documents comprise coupons and said method further comprises the steps of decoding said unique code on a coupon when it is redeemed at a location and using said data base to identify the mailing address to which said coupon had been mailed.

8. The method of claim 7 further comprising the step of storing data in said data base indicating which unique codes have been found on redeemed coupons so that said data base may be used to identify the amount and type of coupon use associated with each person code.

9. A method for producing trackable documents comprising the steps of:
  applying a unique code to each document;
  assembling one or more of said documents in a package means;
  applying a contents code to said package means corresponding to the unique codes on the documents in said package means;
  applying a person code to said package means;
  reading said contents code and said person code on each package means; and
  recording data representative of said contents code and its associated person code in a data base, so that the unique code on a document can be used to uniquely identify the person code on the package means into which said document was packaged.

10. The method of claim 9 wherein said documents comprise coupons.

11. The method of claim 10 wherein said package means comprises a booklet.

12. The method of claim 11 further comprising the steps of decoding said unique code on a coupon when it is redeemed at a location and using said data base to identify the person code for the package means from which said coupon came.

13. The method of claim 12 further comprising the step of storing data in said data base indicating which unique codes have been found on redeemed coupons so that said data base may be used to identify the amount and type of coupon use associated with each person code.

14. A method of tracking a plurality of documents distributed to a variety of recipients, comprising the steps of:
  applying a unique code to each document;
  providing an individual person code for each recipient of at least one of the documents;
  recording the unique codes and the individual person codes in a data base in such a way that each unique code is assocatiated with only one of the person codes;
  scanning the unique codes on the documents when they are used and using the data base to identify the individual person code associated with the unique code on the used document; and
  using that identification information to create a second data base identifying which individual recipients used which particular documents.

15. The method of claim 14 wherein said documents are merchandise-related coupons which can be used when a recipient purchases a product to which the coupon relates.

16. The method of claim 14 wherein the individual person codes comprise a name and a mailing address.

* * * * *

UNITED STATES PATENT AND TRADEMARK OFFICE
CERTIFICATE OF CORRECTION

PATENT NO.   :   4,791,281

DATED        :   December 13, 1988

INVENTOR(S)  :   Johnsen, et al.

It is certified that error appears in the above-identified patent and that said Letters Patent is hereby corrected as shown below:

At column 1, line 58, please delete "produc" and insert --product--.

At Column 2, line 15, after the word "portion" please insert a space.

At Column 3, line 8, please delete "alue" and insert --value--.

Under the references cited, please add:

U.S. Patent No. 4,752,675   (Zetmeir)
U.S. Patent No. 4,739,322   (Katz, et al.)
U.S. Patent No. 4,651,150   (Katz, et al.)
U.S. Patent No. 4,514,815   (Anderson)
U.S. Patent No. 4,423,415   (Goldman)

Signed and Sealed this

Fifteenth Day of August, 1989

*Attest:*

DONALD J. QUIGG

*Attesting Officer*          *Commissioner of Patents and Trademarks*